United States Patent [19]

Sekiguchi

[11] Patent Number: 5,426,746
[45] Date of Patent: Jun. 20, 1995

[54] MICROCONTROLLER WITH PROGRAM RECOMPOSING FUNCTION

[75] Inventor: Kouji Sekiguchi, Kawasaki, Japan

[73] Assignee: Kabushiki Kaisha Toshiba, Kawasaki, Japan

[21] Appl. No.: 272,863

[22] Filed: Jul. 8, 1994

Related U.S. Application Data

[63] Continuation of Ser. No. 605,382, Oct. 30, 1990, abandoned.

[30] Foreign Application Priority Data

Oct. 30, 1989 [JP] Japan .................................. 1-282164

[51] Int. Cl.⁶ .............................................. G06F 11/00
[52] U.S. Cl. .................................. 395/375; 364/244.6; 364/254.2; 364/243; 364/DIG. 1
[58] Field of Search ............... 395/375, 800; 371/10.1, 371/10.2, 19

[56] References Cited

U.S. PATENT DOCUMENTS

| | | | |
|---|---|---|---|
| 4,315,321 | 2/1982 | Parks, III | 395/500 |
| 4,433,413 | 2/1984 | Fasang | 371/25 |
| 4,465,901 | 8/1984 | Best | 380/4 |
| 5,051,897 | 9/1991 | Yamaguchi et al. | 364/200 |
| 5,357,627 | 10/1994 | Miyazawa | 395/575 |

FOREIGN PATENT DOCUMENTS 2312837 1/1977 France .
3900187 9/1989 Germany .

Primary Examiner—Eric Coleman
Attorney, Agent, or Firm—Foley & Lardner

[57] ABSTRACT

A microcontroller has three types of memory; a ROM in which is recorded a program, a programmable first non-volatile memory, and a second non-volatile memory having programmable address data and instruction data zones. When the result of a detection performed by a comparator shows that address data sent over an address bus matches address data sent from the address data zone, an instruction data selection section selects and outputs instruction data stored in the instruction data zone corresponding to the address data in the address data zone, instead of outputting instruction data from the ordinary ROM.

4 Claims, 6 Drawing Sheets

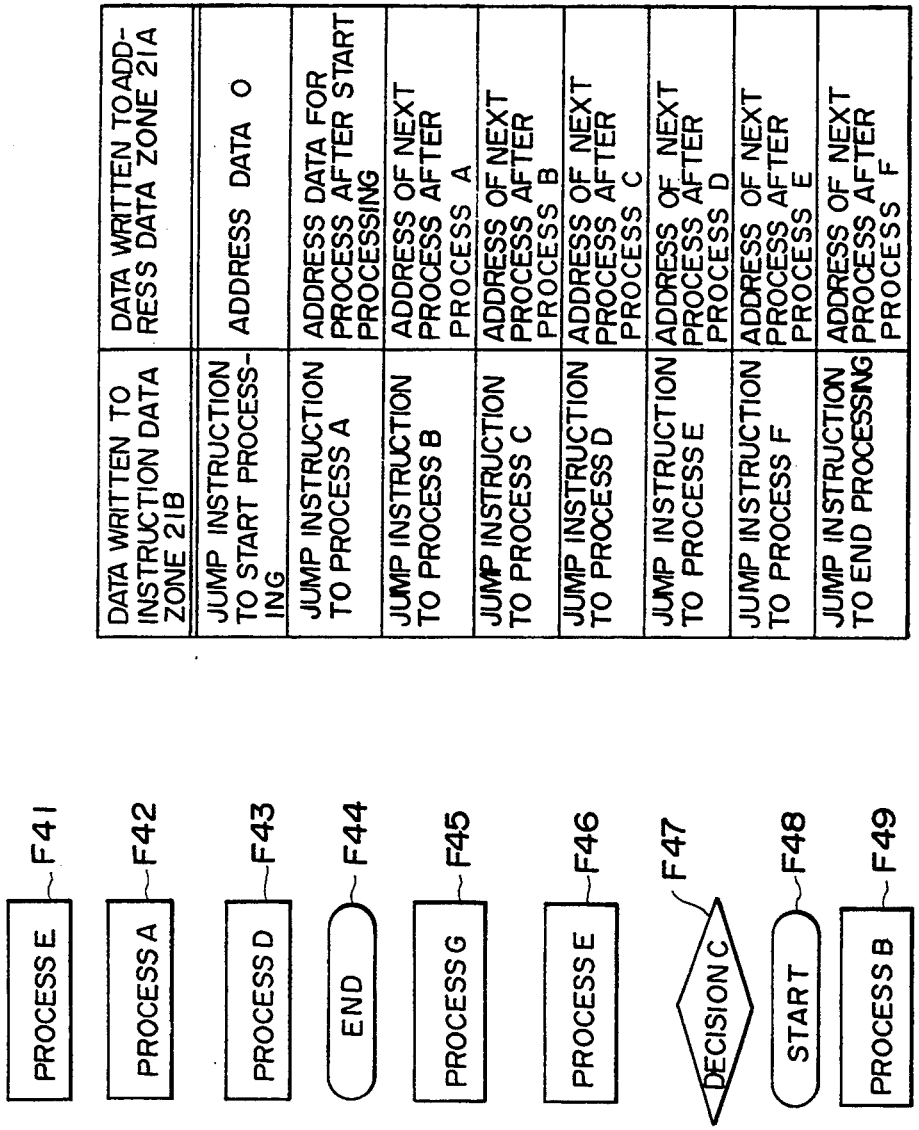

MICROCONTROLLER WITH PROGRAM RECOMPOSING FUNCTION

This application is a continuation of application Ser. No. 07/605,382, filed Oct. 30, 1990, now abandoned.

BACKGROUND OF THE INVENTION

The present invention relates to a microcontroller having non-volatile memory.

When a conventional miocrocontroller having an internal non-volatile memory which is erasable and programmable is activated, an operation notification signal is first sent from a basic signal generation circuit to a program counter. Thereupon, the program counter operates, and an address is sent via an address bus and an address decoder to a ROM in which programs are stored. The instruction at the address in ROM corresponding to that address is then read out from the ROM to an instruction decoder via a data latch and a data bus, and is decoded. A control signal $S_c$ corresponding to the decoded instruction is sent from the instruction decoder to various parts of the microcontroller, and the instruction is executed.

In this conventional microcontroller, programs are recorded in ROM.

The process of developing programs for the above conventional type of microcontroller will now be described with reference to FIG. 6. During the development of a program, the specifications are first verified (step F71), then hardware that satisfies those specifications is selected (step F72). Software is then created in accordance with the selected hardware (step F73), and a program is coded (step F74). After debugging and evaluation of the program (step F75), both hardware and software are checked (step F76). If there is a problem in the software at this point, the flow returns to step F75 for re-verification. Similarly, if there is a hardware problem, and it is determined that the problem cannot be attributed to the software, the flow returns to step F71 for re-verification of the specifications, new hardware is selected, and the above steps are repeated. If there are no problems in the hardware or the software, the flow proceeds to the manufacture of samples of the microcontroller (step F77), and the system is evaluated on the basis of those samples (step F78). The process up to the manufacture of microprocessor samples (step F77) must ordinarily be repeated a number of times. If a problem is found during evaluation of the system containing one of the samples created as described above, the flow must return to step F75. In addition, if a hardware problem is found at this point, the flow must return to step F71 and all of the above steps must be repeated. If no problems are found during system evaluation, mass production and system introduction can start for the first time (step F80).

If, after the sample creation step, the developer finds an error in the program in ROM of a conventional microcontroller created in this way, samples must be manufactured again, no matter how small the correction that is required. This delays completion of the system, which delays its mass production.

If the programmable ROM is EPROM, the program can be easily corrected, but the package will require a window allowing the passage of ultra-violet light, which will increase the cost of the samples and impede mass production. Note that an alternative method using one-time PROM (in which the program can be written once only, and cannot be erased) could be used, but, as with EPROM, each individual program of a suite of programs must be written individually to ROM, impeding mass production.

Note that, in a conventional microcontroller containing non-volatile memory, all program data could be written to non-volatile memory, and such programs can be corrected. However, the writing of all the programs one-by-one to the non-volatile memory during mass production inevitably increases manufacturing costs.

There is another problem with this type of microcontroller in that, if processing routines of a program stored in ROM, for example, the processing routines in FIG. 7, are written to ROM in the sequence in which they are to be processed, the data recorded in ROM can be read out by an external means, making it simple for an unauthorized person to learn the algorithms of the program recorded in ROM.

SUMMARY OF THE INVENTION

Accordingly, an object of the present invention is to provide a microcontroller which facilitates efficient correction of programs stored in ROM.

Another object of the present invention is to provide a microcontroller which makes it difficult for an unauthorized person to learn the algorithms of programs recorded in ROM.

According to the present invention, there is provided a microcontroller comprising: a ROM in which stores a program; a first non-volatile memory which is erasable and programmable; a second non-volatile memory having erasable and programmable address data and instruction data zones; a read/write means which writes data to the second non-volatile memory and reads data therefrom; a comparison means which compares address data sent over an address bus and address data sent from the address data zone, and which sends a notification signal if the address data matches; and an instruction data selection means which normally selects and outputs instruction data stored in the ROM but which selects and outputs instruction data stored in said instruction data zone corresponding to the address data in the address data zone if, and only if, the notification signal has been sent out from the comparison means.

If an error is found in a program stored in ROM of the microcontroller of the present invention, a program that corrects the area in which the error was found is first written to a first non-volatile memory. Next, a read/write means is used to write the address of the error area to an address data zone of a second non-volatile memory, and, corresponding to that address, data on an instruction that jumps to the first non-volatile memory is written to a data zone of the second non-volatile memory. When the address of this error area is subsequently called, the address data in the address data zone matches the address data on the address bus, and a notification signal is output from a comparison means. Based on this notification signal, data on an instruction corresponding to the address data in the address data zone, which is stored in the instruction data zone and which jumps to the first non-volatile memory, is selected and output by a selection means, and the corrected program is run.

In this way, if there is an error in the program stored in ROM, the program can be corrected easily and efficiently. This can reduce turn-around time, increase the range of applicable fields, and facilitate upgrading.

In addition, the algorithms of the program can be made difficult to learn from an external means since the processing sequence of the program in ROM is stored in any desired order, and a program that correctly executes the processing sequence is stored in the second nonvolatile memory, thus preserving secrecy.

BRIEF DESCRIPTION OF THE DRAWINGS

FIGS. 3 and 4 are flow charts used to describe the operation of the microcontroller of the present invention, FIG. 5 is a table used to describe the operation of the present invention.

DESCRIPTION OF THE PREFERRED EMBODIMENT

Figure 2:
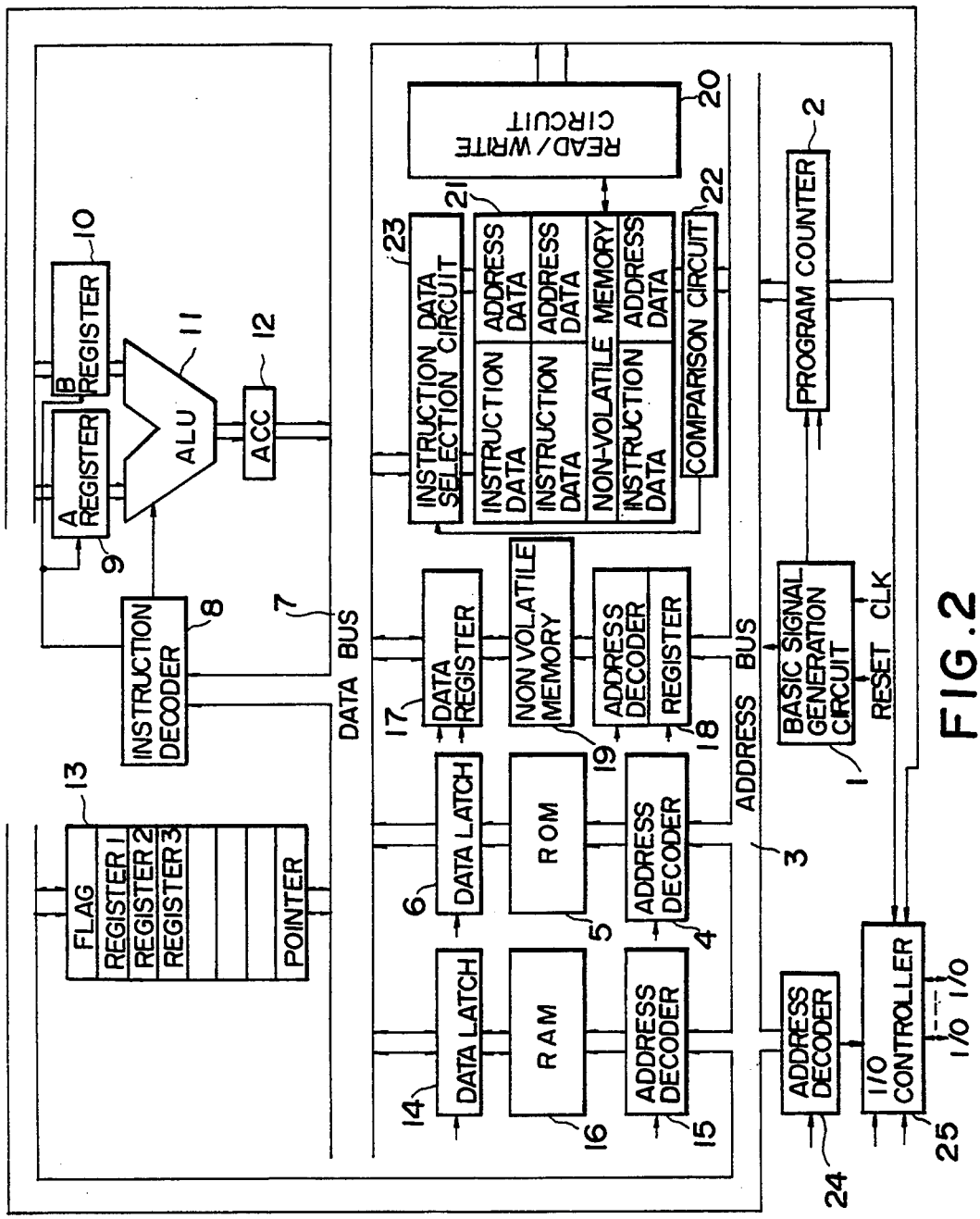
FIG. 2 is a block diagram of the structure of the embodiment of the microcontroller of the present invention.

A block diagram of the structure of a microcontroller according to the present invention is shown in FIG. 2.

The microcontroller of the present invention comprises a basic signal generation circuit 1; a program counter 2 that outputs to an address bus 3 an address in accordance with a basic signal generated by the basic signal generation circuit 1; address decoders 4, 15, and 18 that decode the address; a RAM 5, a ROM 16, and a non-volatile memory 19 that receive decoder outputs from the decoders; and a data latch 6, a data latch 14, and a data register 17 placed between these memory elements and a data bus 7, to exchange data therebetween. An address decoder 24 is also connected to the address bus 3, and an I/O controller 25 that receives addresses from the address decoder 24 is also connected to the data bus 7.

This embodiment concerns the use of the present invention as a calculation circuit which is also provided with an ALU 11 that performs a calculation using data stored in the RAM 16 or non-volatile memory 19; two registers 9 and 10 that are allocated to the ALU 11 and that receive two data items to be added from the data bus 7; an instruction decoder 8 that gives instructions for the ALU 11 and the two registers 9 and 10 from the data on the data bus 7; and a register 13 connected between the data bus 7 and the address bus 3.

The microcontroller is also provided with a read/write circuit 20, a non-volatile memory 21, a comparison circuit 22, and an instruction data selection circuit 23.

The basic operation of the above embodiment will now be described. When the ALU 11 performs a calculation using data stored in the RAM 16 and the non-volatile memory 19, a control signal $S_c$ is first sent to the address decoder 15 or the address decoder 18 and an address of data stored in the RAM 16 or non-volatile memory 19 is set. Thereupon, the data at the address set in this way is sent from the RAM 16 or the non-volatile memory 19 via the data latch 14 or the data register 17, and the data bus 7, to the register 9 and the register 10. The arithmetic operation is then performed by the ALU 11 in accordance with the decoded instruction, based on the data sent to the register 9 and the register 10.

Note that, during this process, the control signal $S_c$ is sent in accordance with the decoded instruction from the instruction decoder 8 to the registers 9 and 10 and the ALU 11, and the processing is based on this control signal $S_c$. The result of the calculation performed by the ALU 11 is either stored in the register 13, the RAM 16, or the non-volatile memory 19 via an accumulator (hereinafter called "ACC") 12 and the data bus 7, or it is output to the outside via the I/O controller 25.

When execution of the single instruction decoded by the instruction decoder 8 ends, the address output previously from the program counter 2 is incremented by 1, and the resultant address is output. The instruction stored at the address in the ROM 5 corresponding to this new address is sent to the instruction decoder 8, and the instruction is executed as described above.

Figure 1:
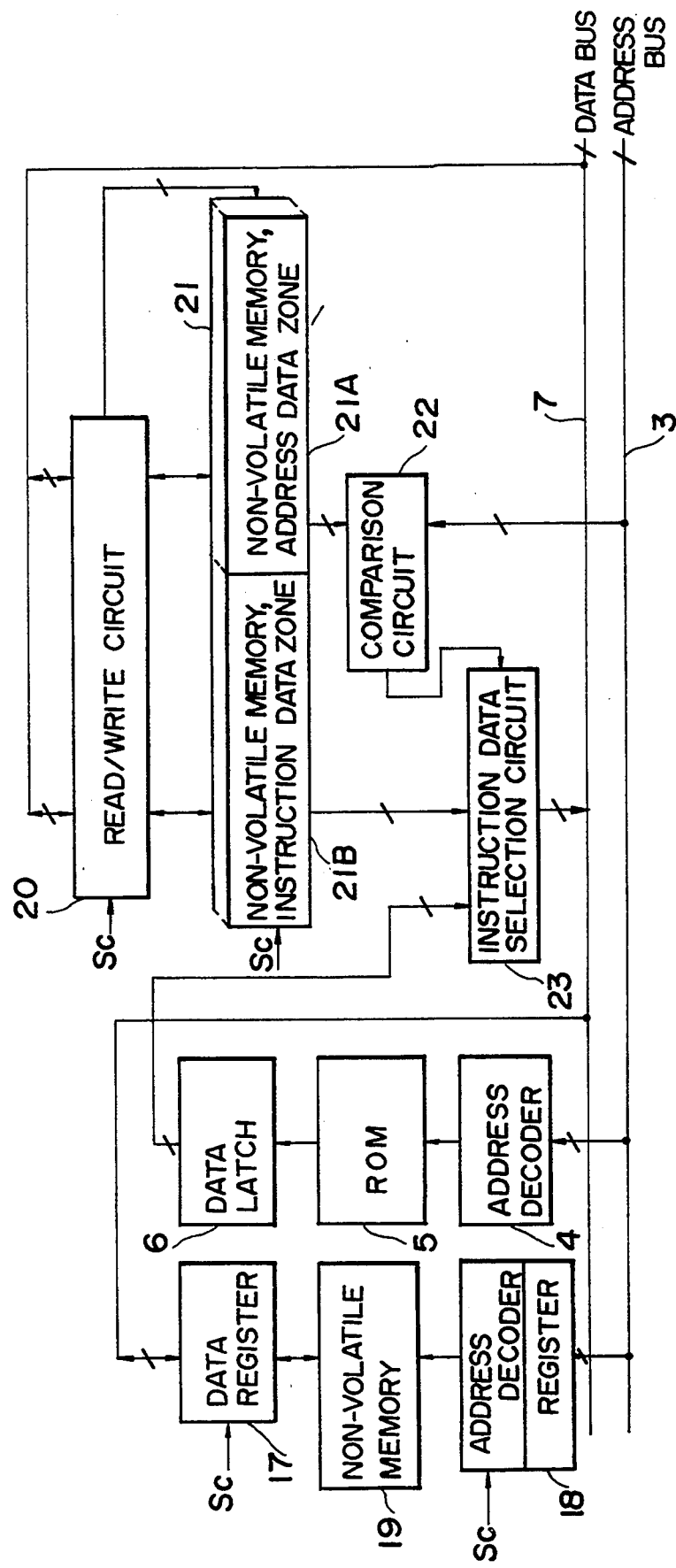
FIG. 1 is a block diagram of the structure of the main components of an embodiment of the microcontroller of the present invention.

The operation of the distinctive components of the present invention will now be described with reference to the abbreviated drawing of FIG. 1.

The non-volatile memory 21 has an address data zone 21A and an instruction data zone 21B belonging thereto. The read/write circuit 20 can both write data sent via the data bus 7 to these two zones 21A and 21B, and read data written to the zones.

The comparison circuit 22 compares address data sent from the address data zone 21A and address data sent via the address bus 3 and, if the data matches, it sends a notification signal to the instruction data selection circuit 23. The instruction data selection circuit 23 normally transfers instruction data that was recorded in the ROM 5 and has been sent via the data latch 6 via the data bus to the instruction decoder 8, but, if it receives the notification signal from the comparison (in other words, if the address data in the address data zone 21A matches the address data sent via the address bus 3), the instruction data selection circuit 23 transfers data recorded in the instruction data zone 21B of the non-volatile memory 21 to the instruction decoder 8 via the address bus 3. The instruction decoder 8 decodes the instruction data transferred in this way and the instruction is executed.

In the non-volatile memory 19 of this embodiment of the present invention, both data and program instructions can be written to the non-volatile memory 19. Therefore, if program instructions are written to the non-volatile memory 19 and the flow is written in such a manner that instruction data stored in the instruction data zone 21B of the non-volatile memory 21 jumps to a region in the non-volatile memory 19 when the address data stored in the address data zone 21A of the non-volatile memory 21 matches the address data sent via the address bus 3, program data created in the ROM 5 can be easily corrected even after the microcontroller has been manufactured.

Figure 3:
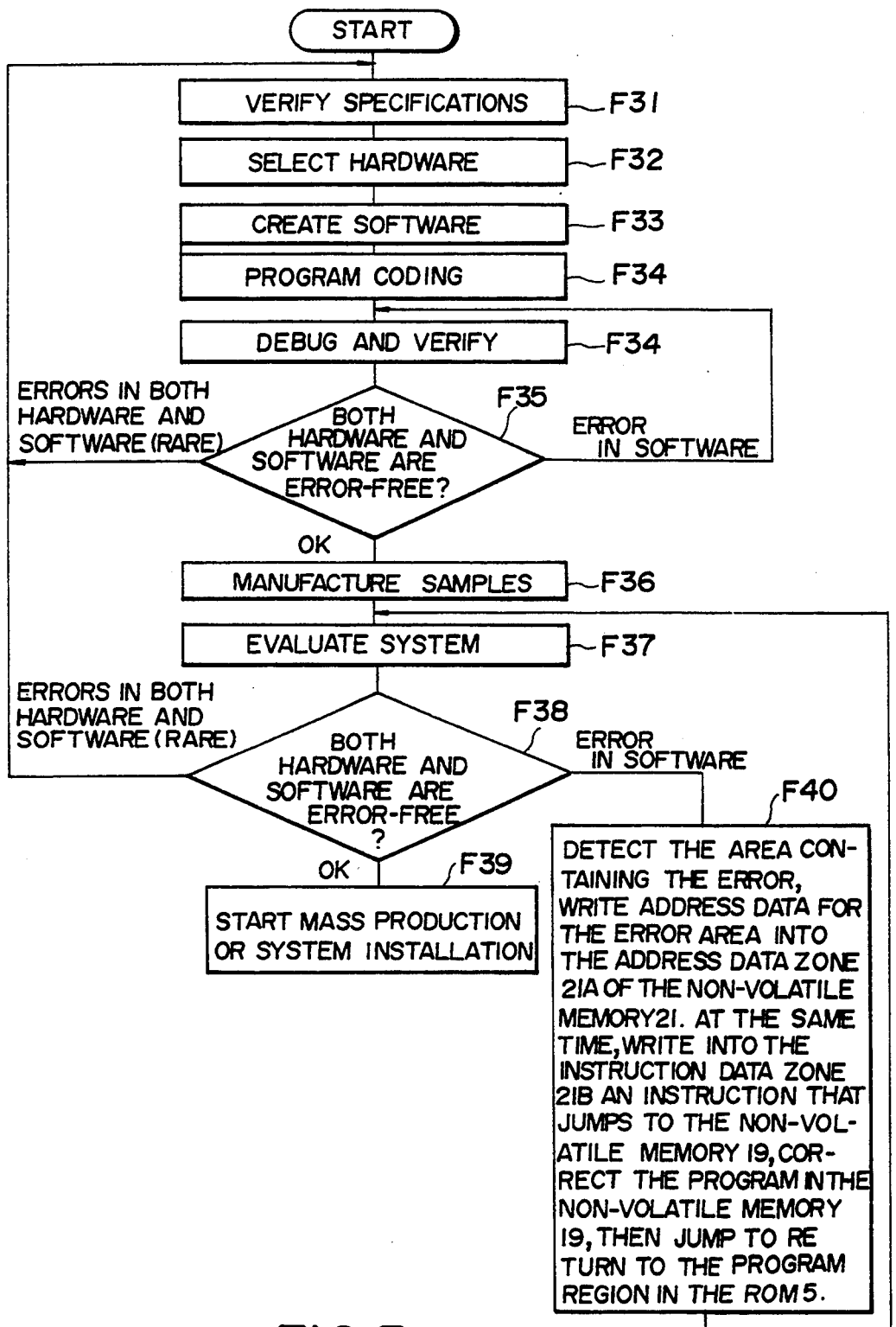
Figure 6:
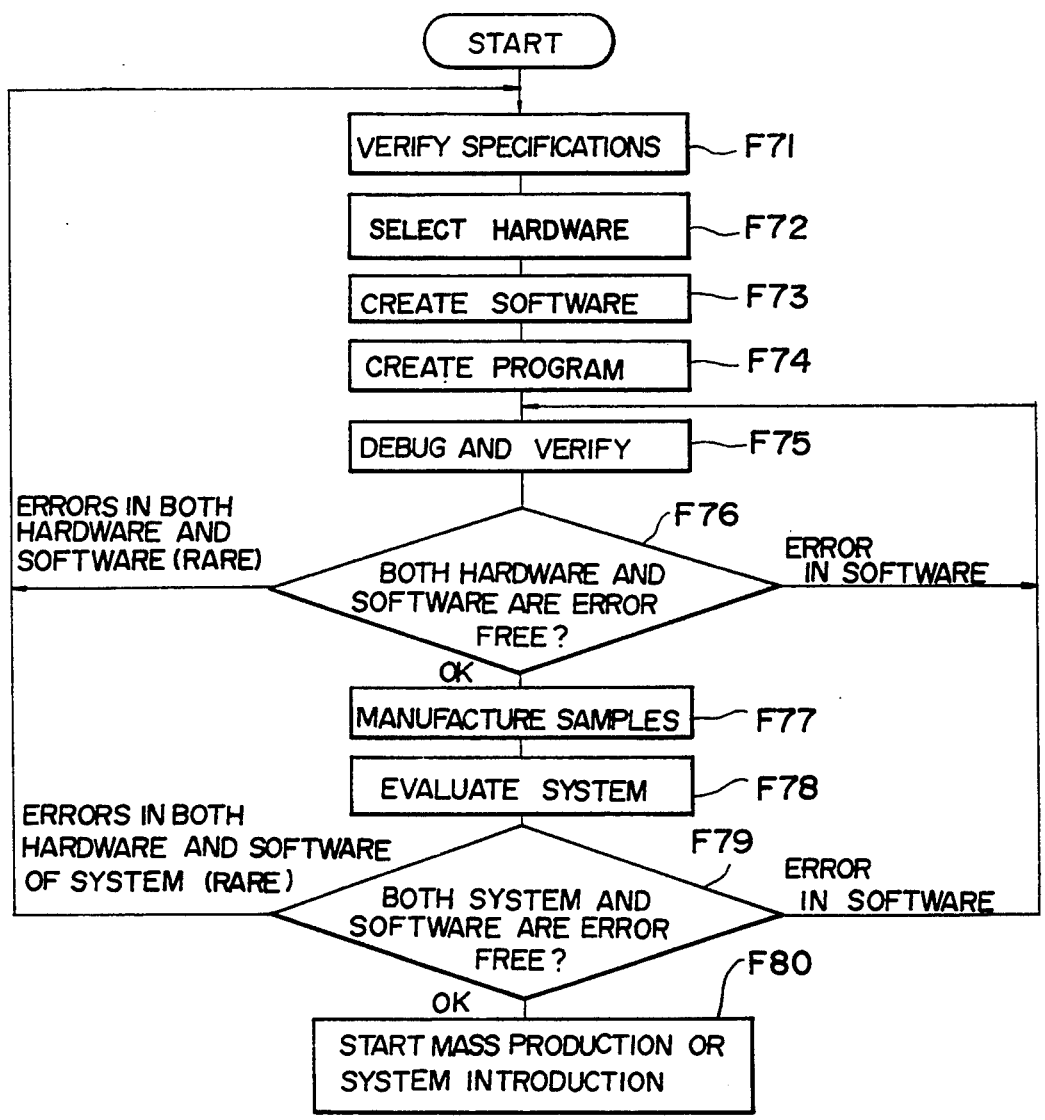
FIGS. 6 and 7 are flow charts used to describe the operation of a conventional microcontroller.

The process of developing a system using the microcontroller of this embodiment will now be described with reference to FIG. 3. From a comparison of FIGS. 3 and 6, it can be seen that the process is the same as the conventional process up to the manufacture of samples. The process differs from the conventional process in that, if a software error is found during the system evaluation of steps F37 and F38, the address of the area containing the error in the software is written to the address data zone 21A of the non-volatile memory 21, an instruction to jump to any desired address in the non-volatile memory 19 is written to the instruction data zone 21B belonging to this address data zone 21A, and the software is corrected in the non-volatile memory 19 (step F40 of FIG. 3). This correction method obviates the need for re-correcting the ROM to correct the samples, so that, by just writing correction areas and additional program data to the non-volatile memories 19 and 21, system introduction and mass production are facilitated.

Figure 7:
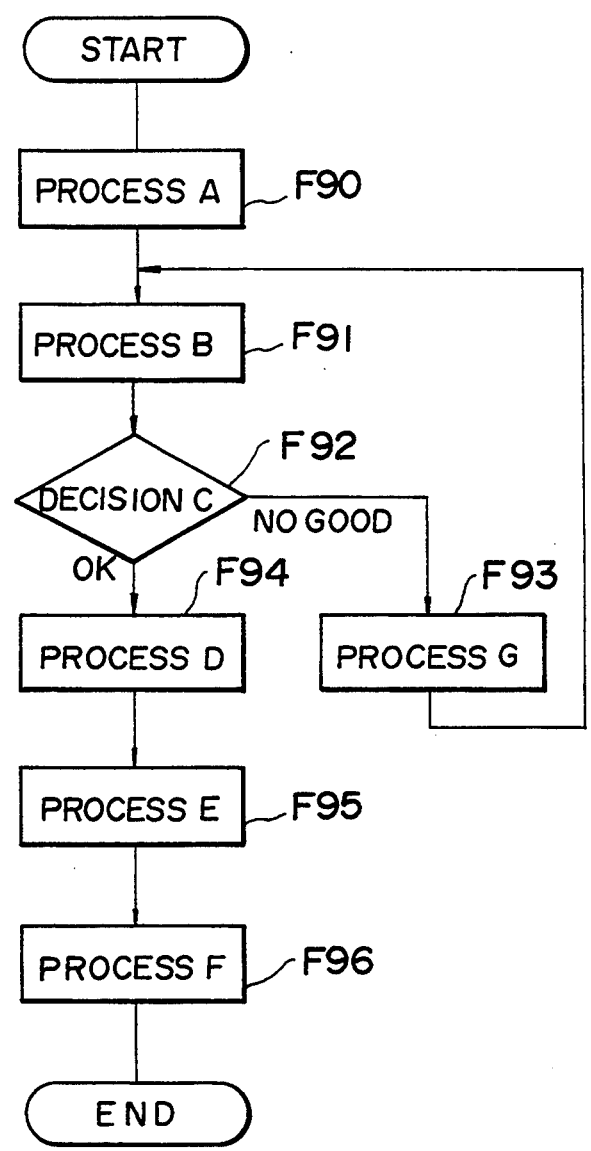

In addition, if the algorithms of the program shown in FIG. 7 are written to ROM non-sequentially as shown in FIG. 4 (steps shown without connections therebetween), to create the commercial product, and data relating the algorithms to each other is written to the address data zone 21A and instruction data zone 21B of the non-volatile memory 21 as shown in FIG. 5, the sequence in which the microcontroller of this embodiment executes the processing routines will be the same as the flow shown in FIG. 7. If this embodiment is organized in this way, the program data in the ROM 5 can be broken up and re-arranged in any desired manner, preventing the use of external means to learn the algorithms of the program written to the ROM 5.

What is claimed is:

1. A microcontroller comprising:
   a ROM for storing an execution program which is not executable in a first sequence;
   a first non-volatile memory for storing data and a program under the control of said execution program;
   a second non-volatile memory for storing address data and instruction data which are used to recompose the execution program into an executable sequence;
   read/write means for writing data to said second non-volatile memory and for reading data therefrom;
   comparison means for comparing designated address data and address data sent from said second non-volatile memory, and for sending a notification signal if both address data match each other; and
   instruction data selection means for normally selecting and outputting instruction data stored in said ROM and for selecting and outputting instruction data stored in said second non-volatile memory when said notification signal is received from said comparison means.

2. A microcontroller according to claim 1, wherein said second non-volatile memory has an address data zone and an instruction data zone.

3. A microcontroller according to claim 2, wherein an address to be accessed after completion of a processing is stored in said data zone and an instruction to be executed after completion of the processing is stored in the instruction data zone.

4. A microcontroller according to claim 1, wherein said ROM stores instruction data of said execution program in a sequence different from the sequence in which said program is to be executed.

* * * * *